Dec. 5, 1961  R. W. OKIE  3,011,427
COFFEE MAKER
Filed May 21, 1959
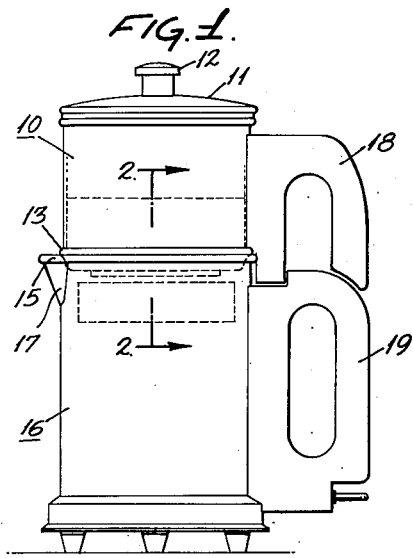
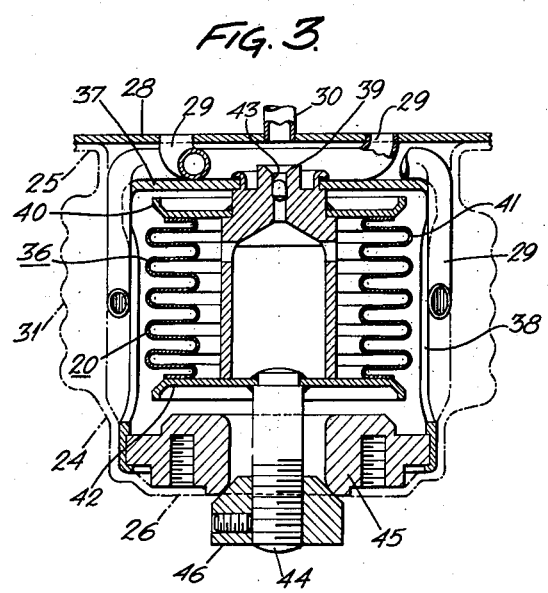
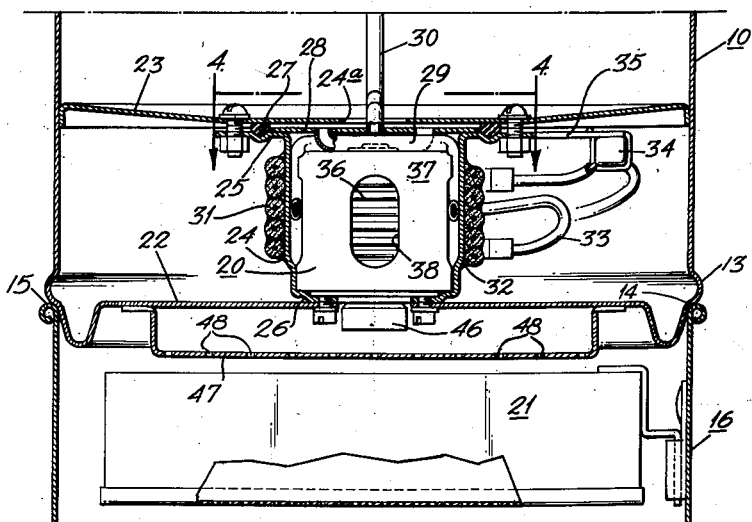
INVENTOR:
REGINALD W. OKIE
BY Howson & Howson
ATTYS.

United States Patent Office 3,011,427
Patented Dec. 5, 1961

3,011,427
COFFEE MAKER
Reginald W. Okie, Oakley Lane, Greenwich, Conn.
Filed May 21, 1959, Ser. No. 814,782
5 Claims. (Cl. 99—283)

The present invention relates to improvements in coffee making apparatus of the drip type and more particularly to an incremental water heating and dispensing apparatus providing for successive heating of small quantities of water and flow of the heated water to the ground coffee.

The coffee maker of the present invention is concerned with the continuous heating of small increments of water, the principle being that accurate control of the temperature of the water results in the brewing of better coffee. In the preferred form of the invention, an upper water container is provided having an opening at its lower end permitting free flow of water to a heating chamber of a smaller capacity than the water container disposed below the upper water container. The heating chamber has a discharge opening at its lower end and houses a thermostat which is operatively connected to a valve for regulating flow through the discharge opening. The valve is opened by operation of the thermostat when the water in the heating chamber has reached a predetermined temperature and automatically closed when the heated water has been discharged and a new quantity of cooler water has been received in the heating chamber from the upper water container. Because of the capacity differential between the container and the heating chamber, it is possible to successively heat and discharge small increments of water thereby affording a close control over the brewing process.

In operation therefore water is free to flow continuously from the upper water container to the heating chamber where at a predetermined temperature it is discharged to a ground coffee container. In this manner it may be seen that there is no need for a critical design of a heating element since the water is automatically discharged from the heating chamber by the coacting relationship of the thermostat and the discharge valve. Additionally with the valve disposed below the heating chamber a continuous flow of water is effected which results in a rapid closely controlled heating process.

My two prior Patents Nos. 2,725,008, and 2,818,010 and a patent to Leonard No. 2,829,583 disclose the principle of heating small increments of water in a coffee making process. The apparatus of the present invention is an improvement on these patents since it provides a simplified structure, one in which the continuous heating of small increments of water provides for a rapid brewing of coffee at an optimum temperature for the making of excellent coffee. It is characteristic, for example, for the heater compartment to be continuously full of water until the upper water container is empty. This is possible because the heater compartment is continuously open through an opening to the upper water container. The increments contained by this compartment are thus of uniform size and more easily heated under conditions uniform from one increment to the next. Moreover, the volume capacity of the chamber is such that the ratio of heat capacity to water volume will cause water in the chamber to be effectively uniformly heated and retain its temperature uniformly.

The primary object of the invention is therefore to provide a means of uniformly heating successive increments of water to the proper temperature to extract aromatic components from the coffee and to keep the volume of water within size limitations which permit uniform heating throughout the volume of each increment.

A further object of the present invention is to provide an apparatus for heating small increments of water successively which is of comparatively simple construction and wherein a smooth and efficient operation are provided.

These and other objects of the present invention and the various features and details of the operation and construction of an embodiment thereof are hereinafter more fully set forth and described with reference to the accompanying drawings, in which:

FIG. 1 is a side elevational view of a coffee maker embodying the water heating apparatus of the present invention;

FIG. 2 is an enlarged sectional view taken along line 2—2 of FIG. 1;

FIG. 3 is a further enlarged sectional view taken along line 3—3 of FIG. 2; and

FIG. 4 is a fragmentary sectional view taken along line 4—4 of FIG. 2.

Referring more specifically to the drawings, and particularly FIG. 1 thereof, reference numeral 10 designates an upper water container adapted to be closed by a lid 11 having a knob or handle 12 by which the lid 11 may be removed from the container. The upper water container 10 is provided with an annular protrusion 13 forming a shoulder 14 adjacent its lower end adapted to engage with the upper peripheral edge 15 of a generally cylindrical coffee pot 16 having a pouring spout 17. A handle 18 secured to the container 10 and pot 16 is provided with a contact member 19 and internal elements of an electric circuit (not shown) for conducting current to the heating apparatus of the present invention.

In accordance with the present invention, means are provided to effect continuous flow of water from the upper container 10 to a heating chamber generally designated 20 wherein small increments of water are successively heated to a predetermined temperature and discharged to a ground coffee basket 21 mounted in the pot 16 below the heating chamber 20. To this end the upper water container 10 which is closed at its lower end by a bottom wall 22 is provided with a plate 23 spaced upwardly from the bottom wall 22. The plate 23 has an opening 24a in the depressed central portion thereof. The water heating chamber 20 is mounted intermediate the bottom wall 22 and the plate 23 in communication with the opening in the plate 23. The heating chamber is defined by a generally cylindrical outer housing in the form of a jacket 24 terminating at its upper end in an annular outwardly extending flange 25 and at its lower end in an annular inwardly extending flange 26. The jacket is secured to the plate 23 and the bottom wall 22 at the upper and lower flange portions 25 and 26 respectively by means of suitable fasteners. An annular sealing member 27 is provided intermediate the upper flange 25 and the plate 23. The jacket is closed at its upper end as shown in FIG. 3 by a cover 28 having openings therein from which tubes 29 extend in order to conduct the water from the upper water container 10 to a point centrally of the jacket 24. Although two tubes are shown, one might be employed or the tubes may be omitted. A vent tube 30 is provided to permit discharge of any air trapped in the heating chamber.

A heating coil 31 is wound about the outer peripheral surface of the jacket 24 and may be integrally secured thereto by means of a soldered connection as shown at 32. A wire 33 connected to a suitable electrical source for providing a current to heat the coil is connected to the coil 31 through a thermal switch 34. The thermal switch 34 is connected to the upper flange of the jacket at its outer edge by an extension arm 35 and is adapted to open the circuit at a predetermined temperature. The switch is actuated to shut off current to the coil when the temperature in the heating chamber 20 exceeds a predetermined amount as sensed through the extension arm 35. This increase in temperature is realized, for example, at the end of a cycle when no more water is passing through the heating chamber or when the temperature of the water trapped in the heating chamber exceeds the temperature at which the water normally is discharged.

The inner wall of the heating chamber is defined by the peripheral surface of a thermomotive member which, as illustrated in FIG. 3, may be a bellows-type thermostat 36 mounted in the jacket 24 coaxially thereof. The thermostat 36 is secured at its upper end to an inverted cup-shape member 37 having openings 38 in the wall thereof. The thermostat comprises a tubular member 39 extending from the closed bottom of the cup-shape member 37. The member carries a plate 40 at its upper end which suspends the bellows 41 of the thermostat from its outer periphery. The bellows is connected at its lower end to a bottom plate 42. The tubular member 39 has an opening 43 at its upper end so that the thermostat may be filled with an expansible medium as for example a fluid sensible to thermal changes. The plate 42 carries a stem 44 which extends downwardly through a valve seat defined by an annular ring 45 mounted in the lower portion of the jacket.

A valve head 46 actuatable axially of the valve opening is suitably mounted on the stem 44 which as shown in FIG. 3 is a threaded connection. It is to be understood that other thermostat constructions, wherein thermal changes effect some type of physical displacement or change of the thermostat operable to actuate the valve 46, may be employed in place of the bellows type illustrated and described.

In order to disperse the water flowing from the heating chamber to the ground coffee, there is provided a spreader plate 47 having a plurality of openings 48 therein so distributed as to spread water uniformly over the coffee in basket 21 beneath. Spreader 47 is mounted on the underside of the bottom wall 22 of the water container 10 sufficiently far below valve 46 to permit the full range of operation of the valve. Water which passes through the open discharge valve tends to distribute evenly over the spreader while awaiting its opportunity to pass through openings 48. As shown in FIG. 2 the basket is mounted in the pot 16 by means of a suitable bracket support. The basket is provided with a foraminous bottom portion so that water passing over the ground coffee contained therein may pass through the openings into the coffee pot 16 for final disposition through the spout.

In the operation of the coffee maker illustrated, assume that the upper water container is filled with water. Water from the container passes through the opening 24 onto the upper wall 28 of the jacket and then through the tubes 29 into the water heating chamber. As noted previously the water heating chamber is the zone defined by the inner wall of the jacket and the outer surface of the thermostat. The water in the heating chamber conducts heat from the heating coil 31 to the bellows and thence to the expansible fluid in the thermostat, which at a predetermined temperature begins to expand. Expansion of the fluid in the thermostat operates the valve 46 thus permitting discharge of the heated water to the perforated deflector 47. The heated water then passes over and through the coffee in the basket 21 and thence to the coffee pot 16. Simultaneous with the discharge of the increment of heated water, a new increment of cool water flows into the heating chamber and when the thermostat has been sufficiently cooled, the valve 46 closes and the new increment of water is heated in a similar manner. When this increment has been heated it will be discharged in the manner outlined above. The cycle is continuously repeated until all of the water in the upper water container has been passed through the heating chamber. As noted previously the current to the coil is shut off at the end of the cycle by operation of the thermal switch 34. This operation is effected by a transfer of the heat which normally is transmitted to the water to the extension arm 35 which in turn effects operation of the switch.

From the foregoing it will be apparent that the present invention provides a novel improvement in coffee making apparatus wherein water for making the coffee is continuously heated in small increments and discharged to the ground coffee at predetermined temperature so that coffee may be brewed quickly and at an optimum temperature for the making of excellent coffee.

While a particular embodiment of the present invention has been illustrated and described herein, it is not intended to limit the invention to such a disclosure and changes or modifications may be incorporated and embodied therein within the scope of the following claims.

I claim:

1. In a coffee maker of the type acting to heat successive increments of water, an upper water container, a heating chamber below said container and extending downwardly therefrom, heating means on said chamber, a thermomotive member mounted within said chamber positioned to be contacted by water in said chamber, the heating chamber having a volume capacity small compared to the capacity of the upper container such that the ratio of heat capacity to water volume will cause water in the chamber to be effectively uniformly heated and retain its temperature uniformly, means defining a continuously open opening in said container connecting said container with said heating chamber to permit water to flow downwardly from the container into said heating chamber in a continuous uninterrupted manner so that the housing will be completely filled at all times by successive increments of water flowing therethrough until the upper water container is empty, a coffee holder at least partially foraminous below said heating chamber, means defining a valve opening in the lower portion of said heating chamber above the coffee holder, and a valve to close said valve opening and connected to said thermomotive member in order to be moved relative to said valve opening upon actuation of said thermomotive member operable to actuate said valve to the open position when water in the heating chamber is heated to a predetermined temperature so that heated water from the chamber can flow downwardly into said coffee holder and more water from the upper container can flow into the heating chamber and operable to actuate the valve to the closed position when the thermomotive member is cooled below the predetermined temperature.

2. Apparatus in accordance with claim 1 in which the thermomotive member is a bellows device fixed relative to the heating chamber at its upper end and having its movable lower end connected to the valve.

3. Apparatus in accordance with claim 1 wherein the heating means is a current conducting resistance heater element and wherein a thermal switch is connected in series with the heater element and thermally associated with said heating chamber so that it is operable when the temperature of said heating chamber rises to a predetermined temperature to open the electrical circuit to the heater element.

4. Apparatus in accordance with claim 1 wherein a partition is provided between the upper water container and the heating chamber and wherein the continuously open opening is provided by passage means through the partition, said passage means limiting flow of the water to the heating chamber whereby water is permitted to flow from the upper water container to a predetermined point in the heating chamber.

5. Apparatus in accordance with claim 4 wherein venting means is provided extending from the heating chamber into the upper water container to a point above the water level therein.

References Cited in the file of this patent

UNITED STATES PATENTS

| | | |
|---|---|---|
| 2,176,081 | Kise | Oct. 17, 1939 |
| 2,498,386 | Alexander | Feb. 21, 1950 |
| 2,767,640 | Holland | Oct. 23, 1956 |
| 2,794,106 | Andres et al. | May 28, 1957 |
| 2,818,010 | Okie | Dec. 31, 1957 |
| 2,829,583 | Leonard | Apr. 8, 1958 |